(12) United States Patent
Yoo

(10) Patent No.: US 6,390,487 B1
(45) Date of Patent: May 21, 2002

(54) DRIVING DIRECTION CHANGING APPARATUS OF BICYCLE HUB

(75) Inventor: Moon-Soo Yoo, Chungcheoungbuk-do (KR)

(73) Assignee: World Industry Co., Ltd. (KR)

( * ) Notice: Subject to any disclaimer, the term of this patent is extended or adjusted under 35 U.S.C. 154(b) by 0 days.

(21) Appl. No.: 09/085,031

(22) Filed: May 28, 1998

(30) Foreign Application Priority Data

Jan. 20, 1998 (KR) .............................................. 98-1616

(51) Int. Cl.⁷ ................................................ B62M 9/06
(52) U.S. Cl. ...................................... 280/237; 280/260
(58) Field of Search ............................... 280/236, 237, 280/238, 259, 260; 475/182, 294, 297, 329, 330

(56) References Cited

U.S. PATENT DOCUMENTS

| | | | | |
|---|---|---|---|---|
| 5,127,883 A | * | 7/1992 | Wen ............................ | 280/236 |
| 5,435,583 A | | 7/1995 | Foster, Jr. | |
| 5,443,279 A | * | 8/1995 | Nurnberger ................. | 280/236 |
| 5,540,456 A | * | 7/1996 | Meier-Burkamp et al. .. | 280/236 |
| 5,904,362 A | * | 5/1999 | Yoo ............................ | 280/237 |
| 5,957,802 A | * | 9/1999 | Yoo ............................ | 475/294 |
| 5,970,822 A | * | 10/1999 | Jung et al. .................. | 280/236 |

FOREIGN PATENT DOCUMENTS

EP  0 369 925  5/1990
KR  97-42078  7/1997

OTHER PUBLICATIONS (1) English Language Abstract of Korean Publication No. 97–42078.

* cited by examiner

Primary Examiner—Anne Marie Boehler
(74) Attorney, Agent, or Firm—Stephen J. Koundakjijan; Charles W. Fallour

(57) ABSTRACT

A driving direction changing apparatus of a rear hub of a bicycle, having a driving portion and a driving direction changing portion, which is capable of always outputting driving force in only one direction, that is, forward, by receiving the forward and rearward driving force of a pedal shaft, is provided. The driving direction changing apparatus includes: a driving portion having a driven sprocket housing movably connected to a hub shaft, a plurality of first and second clutch groups installed at the outer circumference of the leading end of the driven sprocket housing, a first carrier for supporting the first and second clutch pin groups, a clutch housing for driving a hub shell by the expansion force caused by the frictional force of the first clutch pin group, and a first separation preventing member for preventing the clutch housing from being separated; a driving direction changing portion for changing the driving direction by using a second operating lever installed at the driving portion; and a multi-stage transmission portion connected to the driving direction changing portion by a spline, for performing transmission by using the second operating lever.

6 Claims, 15 Drawing Sheets

DRIVING DIRECTION CHANGING APPARATUS OF BICYCLE HUB

TECHNICAL FIELD

The present invention relates to a driving direction changing apparatus of a rear hub for a bicycle, and more particularly, to a driving direction changing apparatus of a rear hub for a bicycle, having a driving portion and a driving direction changing portion, which is capable of always outputting driving force in only one direction, that is, forward, by receiving the forward and rearward driving force of a pedal shaft.

BACKGROUND ART

In general, a bicycle can travel in only one direction, that is, travel forward by pedaling forward, thereby easily causing fatigue in rider's leg and uneven development in a leg muscle when the rider bicycles for many hours.

Thus, in order to solve the problems, many inventors have made an effort in the development of a bi-directional pedaling apparatus which can be applied to a conventional one-directional pedaling bicycle.

The bi-directional pedaling apparatus developed until now may be classified into three fields roughly according to the methods adopted therefor. That is, there are methods using an auxiliary gear, a bevel gear and a planetary gear.

As a representative invention related to the bi-directional pedaling apparatus, Manrzoursos et al. (EPO Publication No. 0,369,925) discloses a bi-directional pedaling apparatus adopting the auxiliary gear, Foster (U.S. Pat. No. 5,435,583) discloses a bi-directional pedaling apparatus adopting the bevel gear and a clutch, and the present applicant (Korean Patent Application No. 95-47910) discloses a bi-directional pedaling apparatus adopting the planetary gear.

However, because the above bi-directional pedaling apparatuses must be attached to the outside of the pedal shaft, the attached apparatus is protruded toward the outside of a bicycle frame, thereby obstructing the pedaling by a rider. In addition, due to the protruded portion, it is difficult to attach the bi-directional pedaling apparatus to a newly developed bicycle which can be folded for portability.

Thus, the above problems has raised requirements in development of a transmission for a bicycle, which can allow the bi-directional pedaling apparatus to be attached to a shaft of a rear wheel.

In order to reduce fatigue in legs during pedaling and effectively utilize the energy applied to the pedals, pedaling rhythm and pedaling force applied to the pedals should be constant. The transmission for a bicycle is developed for satisfying the above conditions, which controls a gear ratio between a driving sprocket and a driven sprocket, thereby properly applying the pedaling force according to a driving resistance to the driving of the bicycle.

As the transmission, there are an external type and an internal type. The external transmission directly changes the gear ratio while applying a chain on a plurality of sprockets having different diameters in sequence which are installed at a pedal shaft and a hub shaft, and the internal transmission changes the gear ratios by installing planetary gears in the rear hub shell.

The internal transmission can be much miniaturized compared with the external transmission and protected from external impact while blocking the influx of dust or foreign substance since the internal transmission is installed in the hub shell.

Due to these advantages, Korean Patent Application No. 97-25869, applied by the present inventor, may be referred to as an example of the inventions related to the internal transmission.

The apparatus of the above invention comprises a driving portion, a driving direction changing portion capable of changing the rearward driving force of the driving portion into the forward direction and a transmission portion capable of reducing the forward rotation rate of the driving direction portion and idling the rear wheel. The driving portion includes a driven sprocket housing with a cylindrical shape, which is rotatably installed at a hub shaft of the rear wheel and elastically supported along the circumference by forward and rearward direction pawls arranged with a predetermined interval, a ratchet fixing ring of the hub shell, coupled with the forward direction pawl of the driven sprocket housing, and a ratchet ring coupled with the rearward direction pawl of the driven sprocket housing. The driving direction changing portion includes a first carrier having planetary gears capable of rolling against the hub shaft while being coupled with the ratchet ring, a first sun gear capable of rolling against the planetary gears of the first carrier, a second carrier fixed to the hub shaft such that the first sun gear and the planetary gears can do the rolling movement, and a second sun gear capable of rolling against the planetary gears of the second carrier and having a forward direction pawl elastically protruded from the circumference for the forward driving. Also, the transmission portion includes a third sun gear capable of connecting with the forward direction pawl of the second sun gear and the fixing ratchet fixed to the hub shell, a third carrier capable of rolling against a gear integrally formed in the hub shaft, the third sun gear and the planetary gears, and a clutch slidably attached between the third carrier and the inner diameter of the second sun gear to be elastically and slidably movable by a level installed outside.

That is, according to the above invention, the driven sprocket housing having the forward and rearward direction pawls is attached in the hub shell, so that the driving direction changing portion rotates the ratchet fixing ring fixed to the hub shell according to the driving direction of the driven sprocket. For example, if the driven sprocket drives forward, the forward direction pawl of the driven sprocket housing rotates the ratchet fixing ring forward, thereby outputting the forward driving force to the hub shell.

Also, the driving portion and the transmission portion which operates in connection with a carrier means are arranged in parallel. Thus, if the rearward driving force is provided, the rearward direction pawl of the driven sprocket housing drives the carrier means, thereby transferring the driving force to the transmission portion connected with the carrier means.

Particularly, the transmission portion can change the rearward driving force of the driving portion into the forward driving force by changing the position of the clutch whose operation is controlled from the outside, and simultaneously maintain or reduce the driving rate, and change the rearward driving force into idling.

However, because the transmission portion and the pawls and the ratchets of the driving portion are always engaged in the above invention, the gears may be damaged by overload during the forward and rearward driving, or noise by the engagement may be generated, requiring a large gap.

DISCLOSURE OF THE INVENTION

It is an object of the present invention to provide a driving direction changing apparatus of a rear hub for a bicycle, having a driving portion and a driving direction changing portion, which is capable of always outputting driving force in only one direction, that is, forward, by receiving the forward and rearward driving force of a pedal shaft.

According to an aspect of the above object, there is provided a driving direction changing apparatus of a rear hub of a bicycle in which a transmission device using planetary gears is installed, the apparatus comprising: a driving portion including a driven sprocket housing movably connected to a hub shaft, a plurality of first and second clutch groups installed at the outer circumference of the leading end of the driven sprocket housing, a first carrier for supporting the first and second clutch pin groups, a clutch housing for driving a hub shell by the expansion force caused by the frictional force of the first clutch pin group, and a first separation preventing member for preventing the clutch housing from being separated; a driving direction changing portion including a first ring gear for driving the hub shell by the expansion force caused by the frictional force of the second clutch pin group, a first idle gear rotating being engaged with a gear formed at the inside of the leading end of the first ring gear, centering a rotating shaft, a second idle gear rotating being engaged with the first idle gear, centering a rotating shaft, a second carrier for supporting the first and second idle gears, and a second ring gear having an inner gear engaged with the second idle gear; and a multi-stage transmission portion connected to one end of the driving direction changing portion and integrally formed with a second separation preventing member installed at the outer circumference.

According to another aspect of the above object, there is provided a driving direction changing apparatus of a rear hub of a bicycle, the apparatus comprising: a driving portion including a driven sprocket housing movably connected to a hub shaft, an idle gear rotating being engaged with a gear formed at the leading end of the driven sprocket housing, and a carrier rotatably supporting the idle gear centering a rotating shaft; and a driving direction changing portion installed inside and outside the carrier, for changing the driving of the driving portion into the forward and rearward directions.

Thus, in the driving direction changing apparatus according to the present invention, the driving direction changing portion for capable of driving the bicycle forward while pedaling counterclockwise is installed, such that the forward traveling by the forward and rearward pedaling can be controlled according to the rider's intention, thereby optimizing efficiency in traveling and uniformly developing legs' muscle while reducing fatigue.

According to the basic structure of the driving direction changing apparatus of the present invention, the hub shell is rotatably installed on the hub shaft by bearings, having an "H"-shaped cross-section, and the driving direction changing portion and the driving portion are installed at the sides thereof. Also, the driven sprocket housing fixed to the driven sprocket which drives in connection with the pedal shaft via a chain is tightly installed at the side of the hub shell.

Also, a conventional multi-stage transmission portion is installed in the hub shell to operate in connection with the driving direction changing portion and the driving portion.

The driving force transfer mechanism in the present invention is as follows briefly.

First, the driving force generated by pedaling reaches the driven sprocket via a crank, a driving sprocket and a chain in sequence. The driving force is transferred to the driving portion and the driving direction changing portion of the apparatus of the present invention in sequence while the driven sprocket rotates together with a driving wheel.

The driving force transferred to the driving direction changing portion is transferred to the transmission portion, and the transmission force of the transmission portion is then output to the hub shell, thereby driving the rear wheel of the bicycle.

BEST MODE FOR CARRYING OUT THE INVENTION

<Embodiment 1>

Figure 1A:
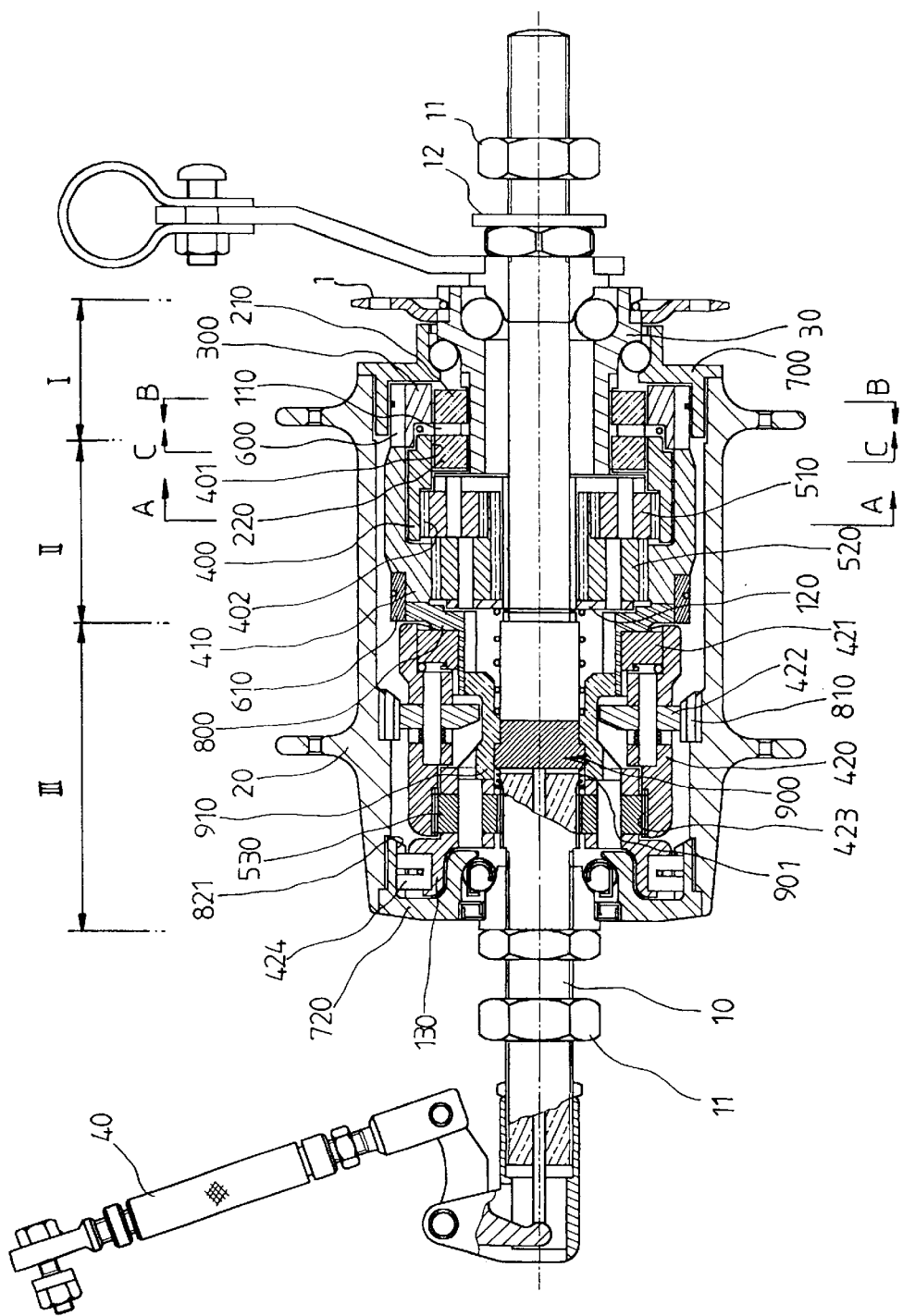
FIG. 1A is a section view of a driving direction changing apparatus for a bicycle hub according to the first embodiment of the present invention when a pedal is driven forward at a high rate.

As shown in FIG. 1A, a hub shaft 10 has a rod-like shape, having screws and splines along its circumference. The hub shaft 10 goes across the center of a hub shell 20, and the left and right ends thereof are fixed by fixing means such as nuts 11 and locking washer 12 such that tightness with the hub shell 20 is maintained.

Figure 3:
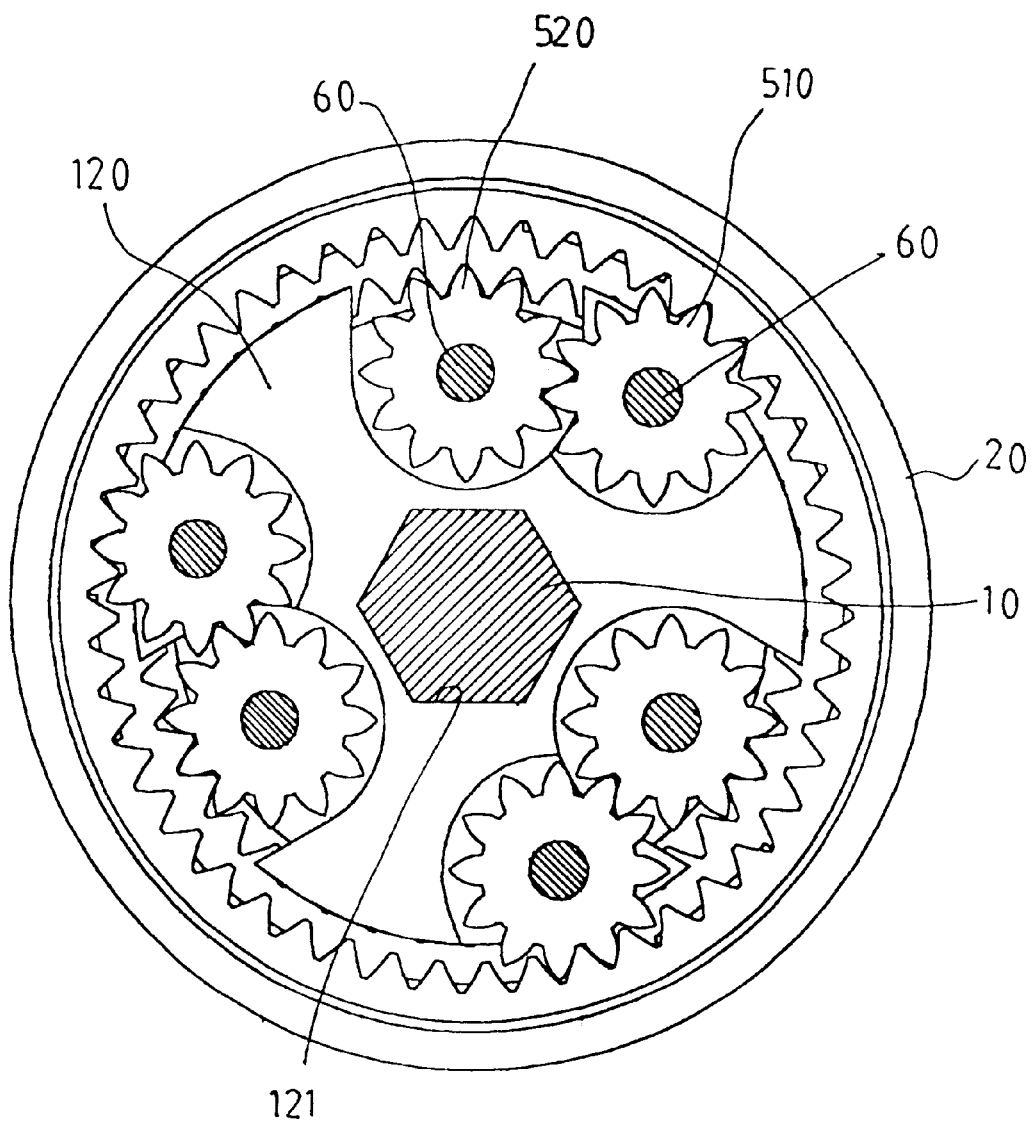
FIG. 3 is an enlarged section view cut along line A—A of FIG. 1A.

Also, a hexagonal portion is formed at the center of the hub shaft 10 as shown in FIG. 3 such that the hexagonal portion is inserted to a fixing hole 121 formed at a second carrier 120.

Figure 4A:
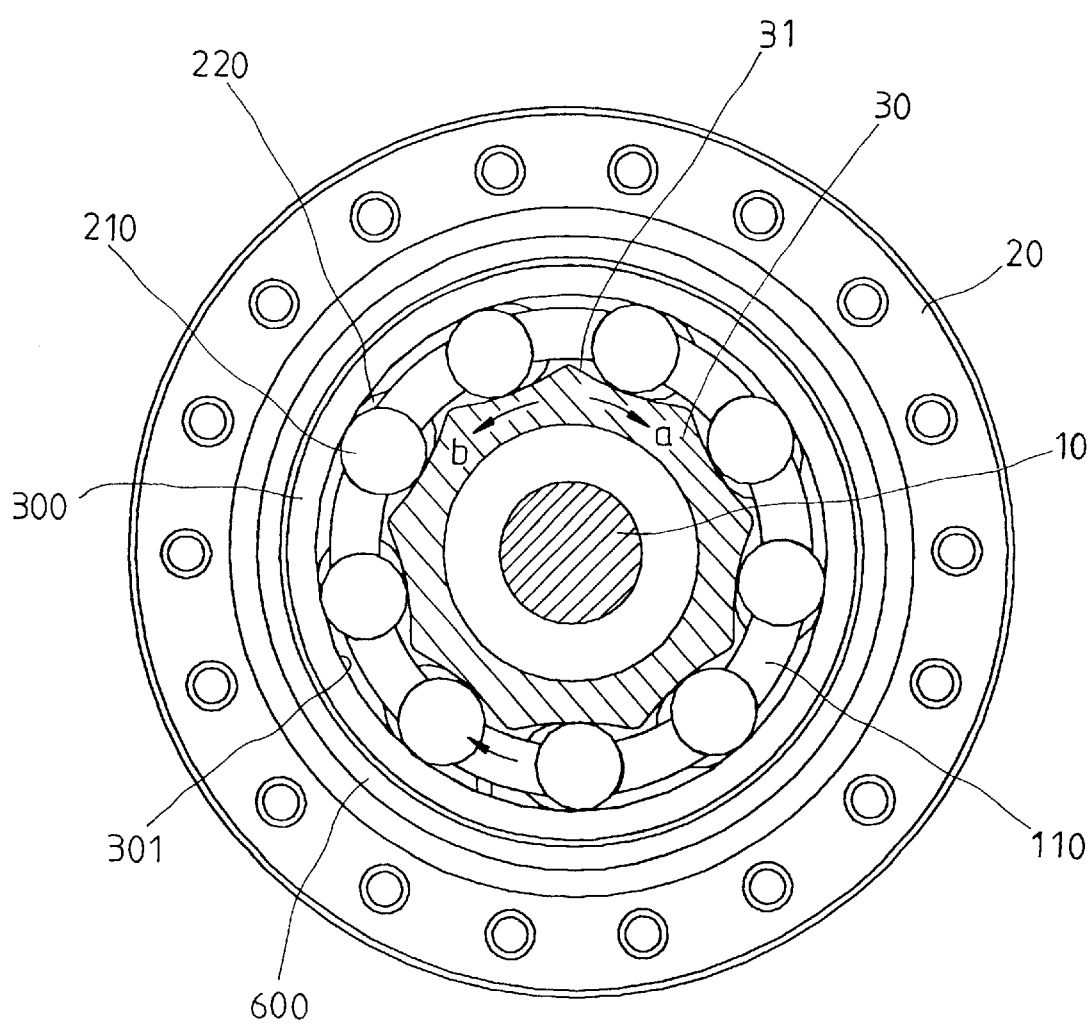
FIG. 4A is an enlarged section view cut along line B—B of FIG. 1A.

As shown in FIG. 4A, at the circumference of the leading end of a driven sprocket housing 30, a polygonal curved portion 31, the side view of which is shown as a polygon, is formed, and a first clutch pin group 210 and a second clutch pin group 220 rotatably installed in a first carrier are installed to contact the curved portion 31.

Figure 2:
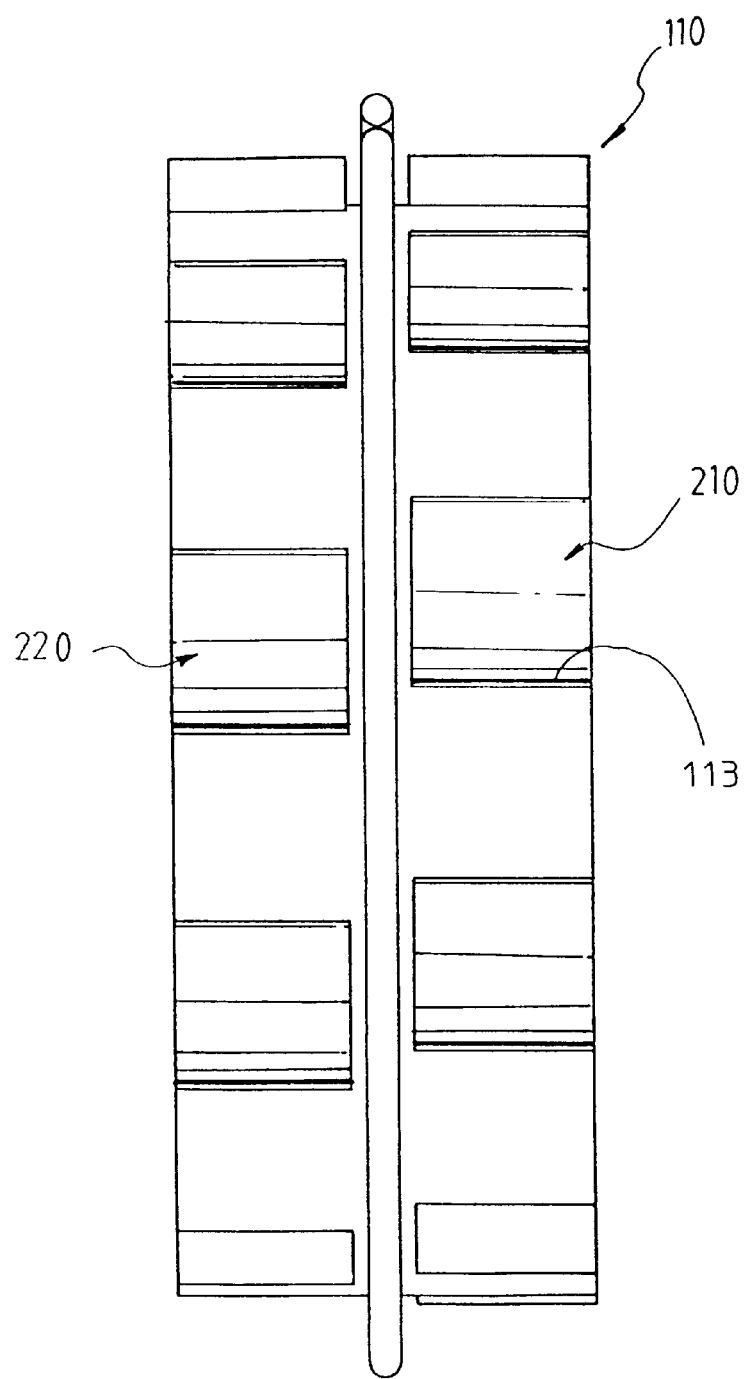
FIG. 2 is a front view of the first carrier of the driving direction changing apparatus according to the first embodiment.

Here, as shown in FIG. 2, the first and second clutch pin groups 210 and 220 are rotatably installed in fixing portions 113 of the carrier 110, diagonally facing each other, and transfer the driving force in only one direction along the curved portion 31 of the driven sprocket housing 30.

Also, a clutch housing 300 having a frictional portion 301 in its inside is installed at the circumference of the first clutch pin group 210, and a first ring gear 400 is installed at the circumference of the second pin group 220.

The first ring gear 400 has a frictional portion 401 at the inside of one end, which is installed to be separated from or contact the second clutch pin group 200 by expansion force caused by the friction, and a gear 402 at the other end, which is engaged with a first idle gear 510 fixed to a second carrier 120.

On the other hand, the second carrier 120 has three or four fixing holes with multiple steps, and the first and second idle gears 510 and 520 having different lengths are installed to be rotatable centering around a rotary shaft 60 as a support point.

Here, the first idle gear 510 is shorter than the second idle gear 520.

Then, a second ring gear 410 is installed at the circumference of the second carrier 120.

A transmission portion III is installed at one side of the second ring gear 410, being connected by a spline, and simultaneously the first and second connecting members 600 and 610 are installed at both ends of the second ring gear 410.

The transmission portion III includes a first ratchet member 800 coupled with the second ring gear 410 by a spline, a first pawl 421 intermittently entangled with the first ratchet member 800, a third ring gear 420 for rotatably fixing the first and second pawls 421 and 422, having a gear 423 at the inside of its leading end, a second ratchet member 810 intermittently engaged with the second pawl 422, a third carrier 130 for rotatably fixing a third idle gear engaged with the gear 423 formed at the inside of the third ring gear 420, a third pawl 424 installed at the circumference of the third carrier 130, a third ratchet member 820 having a ratchet 821 intermittently engaged with the third pawl 424, a clutch portion 900 for changing traveling rate, being installed in the longitudinal direction of the hub shaft 10, and a first control lever 40 for controlling the clutch portion 900.

Here, the third ratchet member 820 is coupled with the hub shell 20 by a screw.

Reference numeral 910 represents a transmission member which operates by the first control lever 40 and installed elastically against an elastic fragment 901.

The operation of the driving direction changing apparatus of a bicycle hub, having the above structure, according to the present invention, which adopts an intermittent friction method, will be described.

1. Driving force transfer pathway during a forward pedaling
 a) Forward traveling at a high rate
  When pedaling forward via a chain connected with a pedal shaft as shown in FIG. 1A, a driven sprocket housing 30 rotates forward as shown in FIG. 4A, that is, in the arrow direction "a", and the first clutch pin group 210 contacting the curved portion 31 of the driven sprocket housing 30 ascends to the uppermost of the curved portion 31, that is, from "P" to "P'" of FIG. 5A. As a result, the clutch housing 300 is driven by the expansion force caused by the frictional force of the first clutch pin group 210, and such driving force is transferred to the second ring gear 410.

Then, the first ratchet member 800 connected to the second ring gear 410 by a spline rotates, and the rotating force is transferred to the third idle gear 530 and the third ring gear 420 in sequence via the transmission member 910.

The rotating force transferred to the third ring gear 420 is transferred to the second ratchet member 810 via the second pawl 422 and finally output via the hub shell 20. The driving force output to the hub shell travels the rear wheel of a bicycle at a high rate.

Figure 1B:
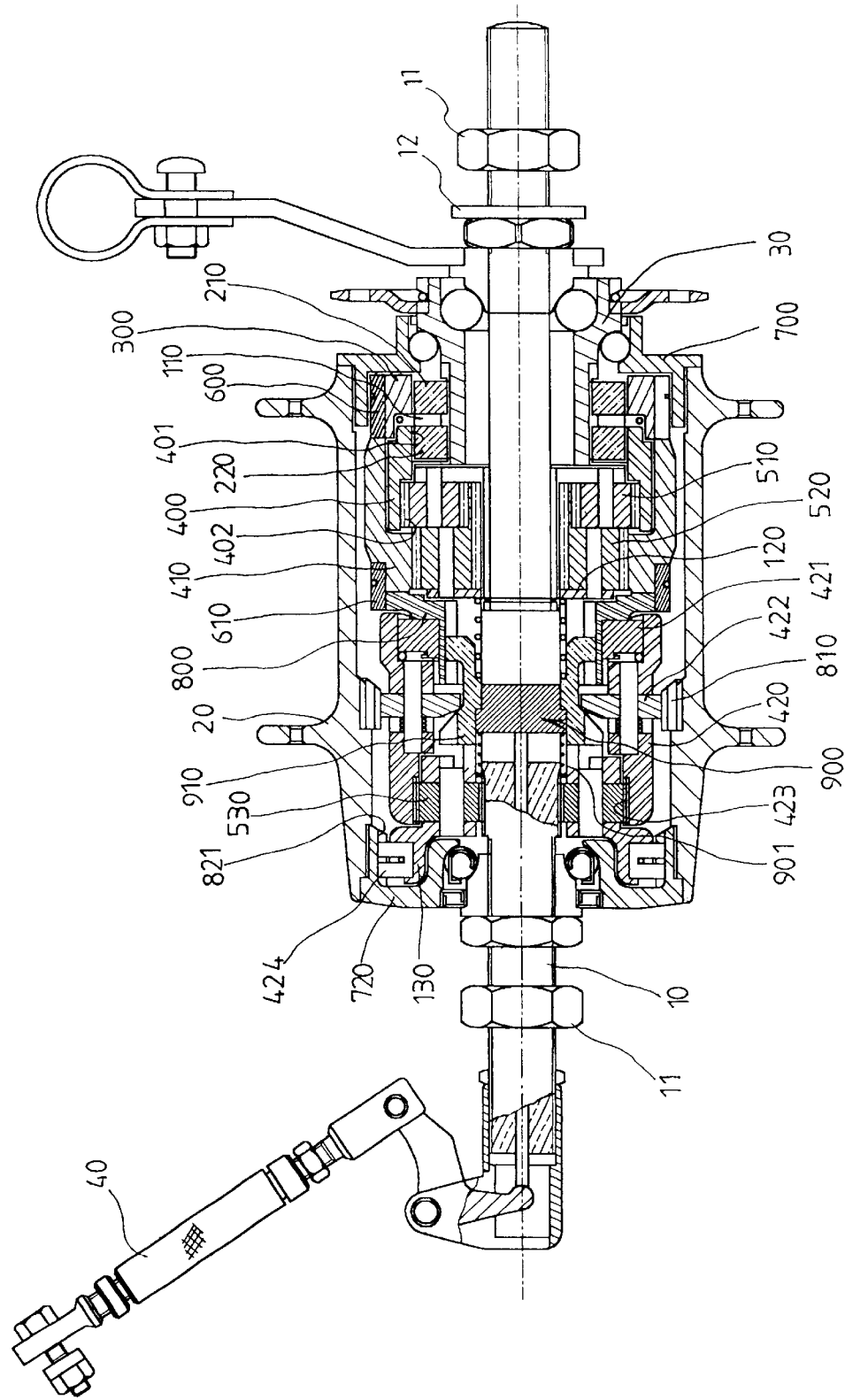
FIG. 1B is a section view of the driving direction changing apparatus of FIG. 1A when the pedal is driven forward at a middle rate.

Here, the first and second idle gears 510 and 520 and the second ring gear 410 rotate rearward, the second clutch pin group 220 slidably rotates with respect to the second ring gear 410, the first pawl 421 positioned at the first ratchet member 800 and the third ring gear 420 slidably rotate, and the third idle gear 530 rotates by the rotation of the third carrier 130, thereby rotating the third ring gear 520 at a high rate.

b) Forward traveling at a middle rate
  When the first control lever 40 is positioned at a middle level as shown in FIG. 1B, the transmission member 910 of the transmission portion III is separated from the third carrier 130.

Figure 5A:
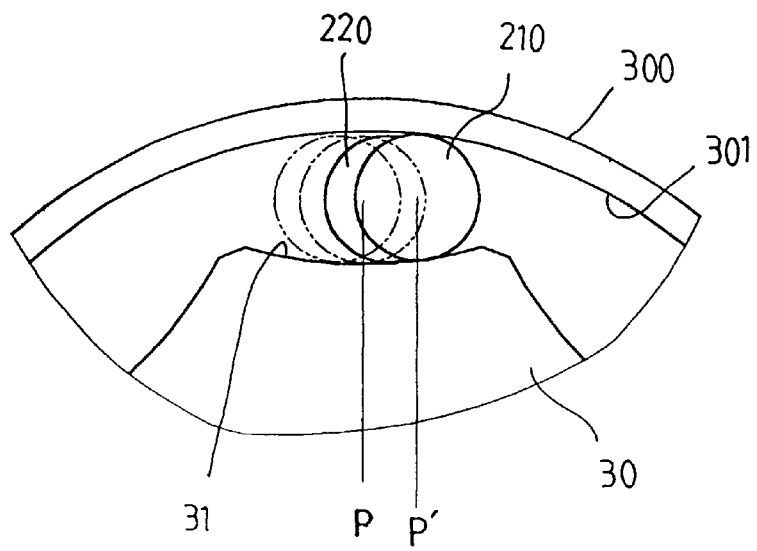
FIGS. 5A and 5B are partial views extracted to illustrate the operation states of the clutch pin group during forward and rearward driving, respectively.

When pedaling forward via the chain connected with the pedal shaft, the driven sprocket housing 30 rotates forward as shown in FIG. 4A, that is, in the arrow direction "a", and the first clutch pin group 210 contacting the curved portion 31 of the driven sprocket housing 30 ascends to the uppermost of the curved portion 31, that is, from "P" to "P'" of FIG. 5A. As a result, the clutch housing 300 is driven by the expansion force caused by the frictional force of the first clutch pin group 210, and such driving force is transferred to the second ring gear 410.

Then, the first ratchet member 800 connected to the second ring gear 410 by a spline rotates, and the rotating force is transferred to the third ring gear 420 via the first pawl 421 and then to the second ratchet member 810 via the second pawl 422 installed in the third ring gear 420, and finally output to the hub shell 20. The driving force output to the hub shell travels the rear wheel of the bicycle at a middle rate.

Figure 1C:
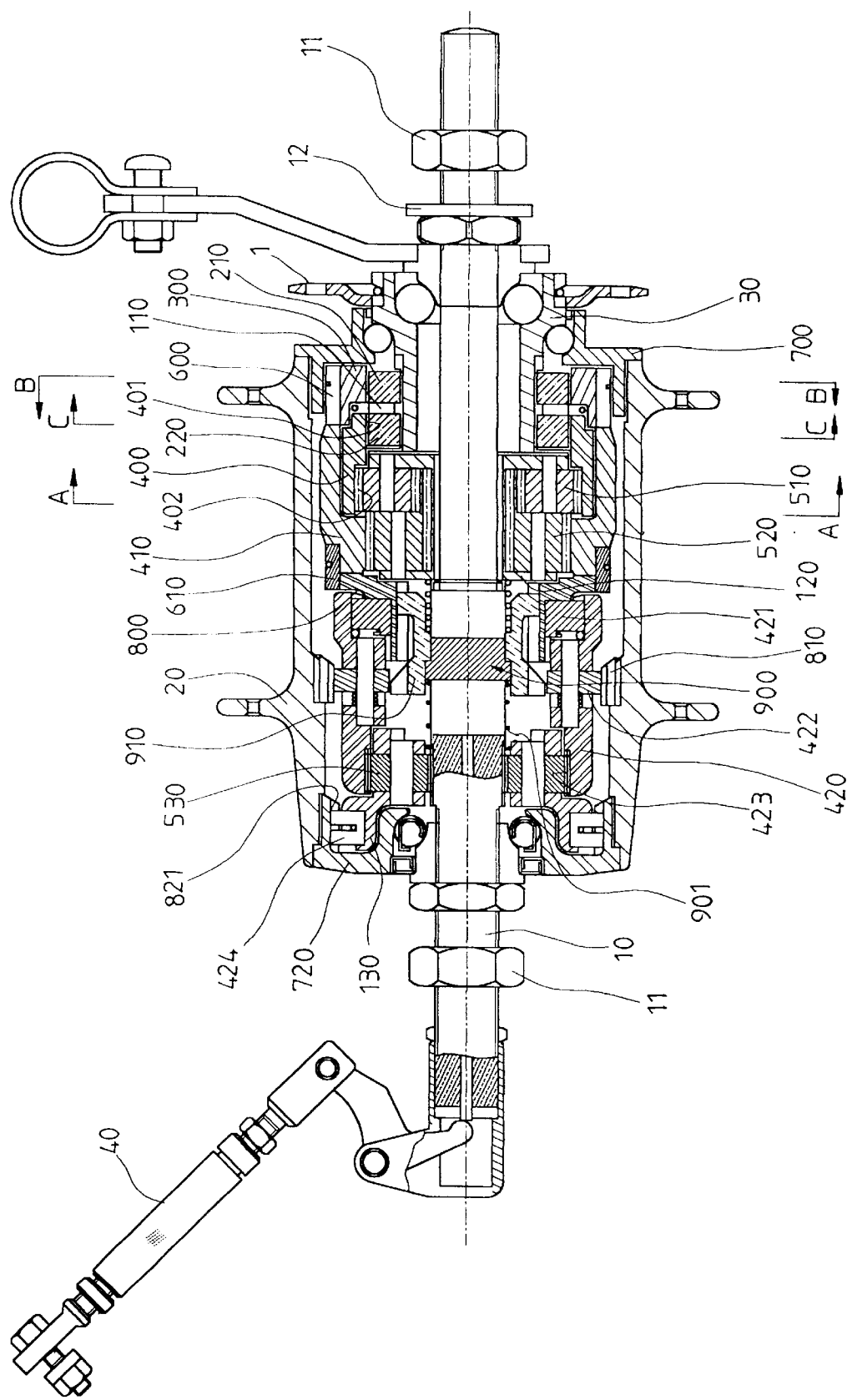
FIG. 1C is a section view of the driving direction changing apparatus of FIG. 1A when the pedal is driven forward at a low rate.

Here, the first and second idle gears 510 and 520 and the second ring gear 410 rotate rearward, and the second clutch pin group 220 slidably rotates with respect to the second ring gear 410.

c) Forward traveling at a low rate
  When the first control lever 40 is positioned at a right end as shown in FIG. 1C, the second pawl 422 is separated from the second ratchet member 810 by the transmission member 910 of the transmission portion III.

When pedaling forward via the chain connected with the pedal shaft, the driven sprocket housing 30 rotates forward as shown in FIG. 4A, that is, in the arrow direction "a", and the first clutch pin group 210 contacting the curved portion 31 of the driven sprocket housing 30 ascends to the uppermost of the curved portion 31, that is, from "P" to "P'" of FIG. 5A. As a result, the clutch housing 300 is driven by the expansion force caused by the frictional force of the first clutch pin group 210, and such driving force is transferred to the second ring gear 410.

Then, the first ratchet member 800 connected to the second ring gear 410 by a spline rotates, and the driving force of the first ratchet member 800 is transferred to the third ring gear 420 via the first pawl 421 and then to the third idle gear 530 engaged with the gear 423 formed at the leading end of the third ring gear 420, and then to the third carrier 130, and then finally output to the hub shell 20. The driving force output to the hub shell travels the rear wheel of the bicycle at a row rate.

Here, the first and second idle gears 510 and 520 and the second ring gear 410 rotate rearward, and the second clutch pin group 220 slidably rotates with respect to the second ring gear 410.

Figure 4B:
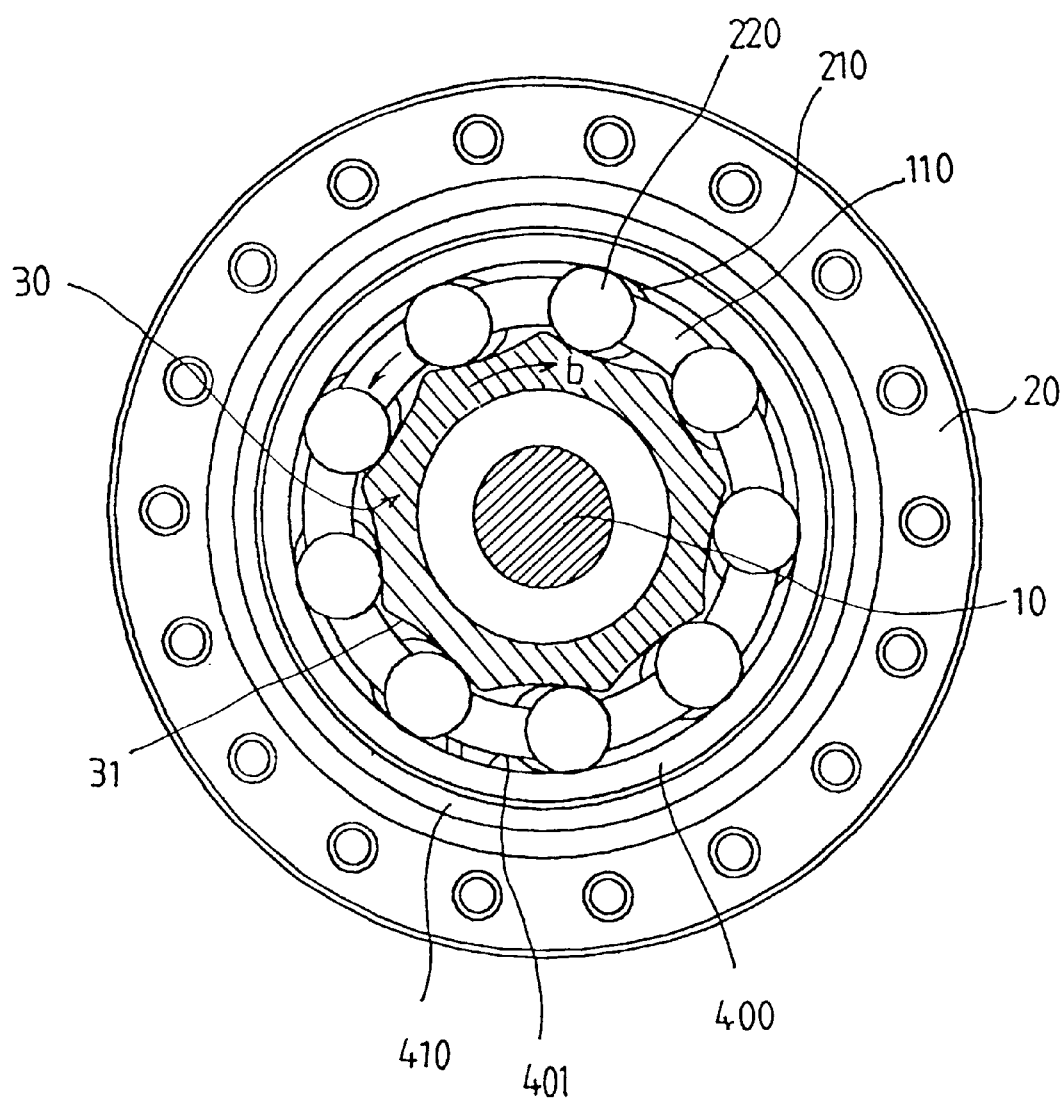
FIG. 4B is an enlarged section view cut along line C—C of FIG. 1A.

2. Driving force transfer pathway during a rearward pedaling a) Rearward traveling at a high rate When pedaling rearward via the chain connected with the pedal shaft as shown in FIG. 1A, the driven sprocket housing 30 rotates rearward as shown in FIG. 4B, that is, in the arrow direction "b", and the second clutch pin group 220 contacting the curved portion 31 of the driven sprocket housing 30 ascends to the opposite uppermost of the curved portion 31, that is, from "P" to "P''" of FIG. 5B. As a result, the first ring gear 400 rotates by the expansion force caused by the frictional force of the second clutch pin group 220, and the driving force is transferred to the second idle gear 520 via the first idle gear 510, thereby rotating the second ring gear 410 forward.

Then, the first ratchet member 800 connected to the second ring gear 410 by a spline rotates, and the rotating force of the first ratchet member 800 is transferred to the third idle gear 530 and then to the third ring gear 420 via the transmission member 910.

Then, the rotating force transferred to the third ring gear 420 is transferred to the second ratchet member 810 via the second pawl 422 and then finally output to the hub shell 20. The forward driving force output by driving the hub shell rearward travels the real wheel of the bicycle at a high rate.

Here, the clutch housing 300 and the first pawl 421 slidably rotate.

b) Rearward traveling at a middle rate

When the first control lever 40 is positioned at a middle level as shown in FIG. 1B, the transmission member 910 of the transmission portion III is separated from the third carrier 130.

Figure 5B:
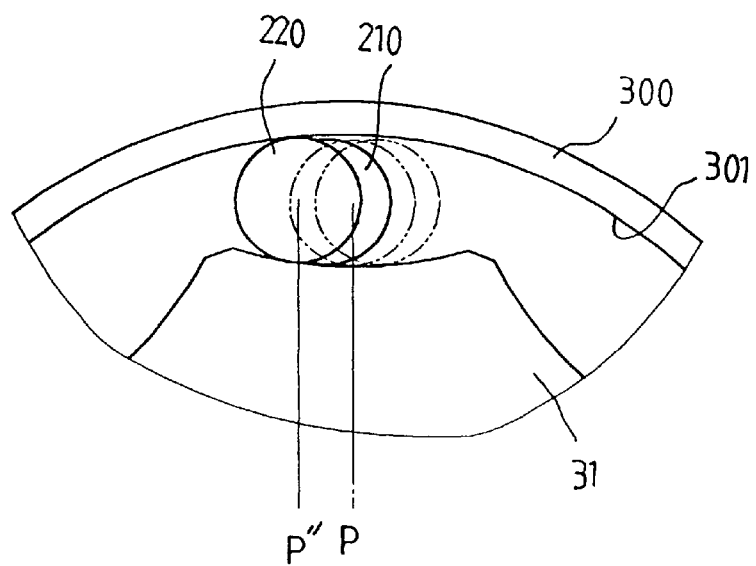

When pedaling rearward via the chain connected with the pedal shaft, the driven sprocket housing 30 rotates rearward as shown in FIG. 4B, that is, in the arrow direction "b", and the second clutch pin group 220 contacting the curved portion 31 of the driven sprocket housing 30 ascends to the opposite uppermost of the curved portion 31, that is, from "P" to "P''" of FIG. 5B. As a result, the first ring gear 400 rotates by the expansion force caused by the frictional force of the second clutch pin group 220, and the driving force is transferred to the second idle gear 520 via the first idle gear 510, thereby rotating the second ring gear 410 forward.

Then, the first ratchet member 800 connected to the second ring gear 410 by a spline rotates, and the rotating force of the first ratchet member 800 is transferred to the third ring gear 420 via the first pawl 421 and then to the second ratchet member 810 via the second pawl 422 installed in the third ring gear 420, and then finally output to the hub shell 20. Then, the driving force output to the hub shell travels the rear wheel of the bicycle at a middle rate.

Here, the clutch housing 300 and the first pawl 421 slidably rotate.

c) Rearward traveling at a low rate

When the first control lever 40 is positioned at a right end as shown in FIG. 1C, the second pawl 422 is separated from the first ratchet member 800 by the transmission member 910 of the transmission portion III.

When pedaling rearward via the chain connected with the pedal shaft, the driven sprocket housing 30 rotates rearward as shown in FIG. 4B, that is, in the arrow direction "b", and the second clutch pin group 220 contacting the curved portion 31 of the driven sprocket housing 30 ascends to the opposite uppermost of the curved portion 31, that is, from "P" to "P''" of FIG. 5B. As a result, the first ring gear 400 rotates by the expansion force caused by the frictional force of the second clutch pin group 220, and the driving force is transferred to the second idle gear 520 via the first idle gear 510, thereby rotating the second ring gear 410 forward.

Then, the first ratchet member 800 connected to the second ring gear 410 by a spline rotates, and the driving force of the first ratchet member 800 is transferred to the third ring gear 420 via the first pawl 421 and then to the third idle gear 530 engaged with the gear 423 formed at the leading end of the third ring gear 420, and then to the third carrier 130, and then finally output to the hub shell 20. Then, the driving force output to the hub shell travels the rear wheel of the bicycle at a low rate.

3. Pulling back of a stopped bicycle

The first and second clutch pin groups 210 and 220 alternately move to the upper and lower ends, that is, from "P" to "P''" and from "P" to "P'''" as shown in FIGS. 5A and 5B, so that the bicycle is pulled back while the pedal rotates forward or rearward.

<Embodiment 2>

Figure 6:
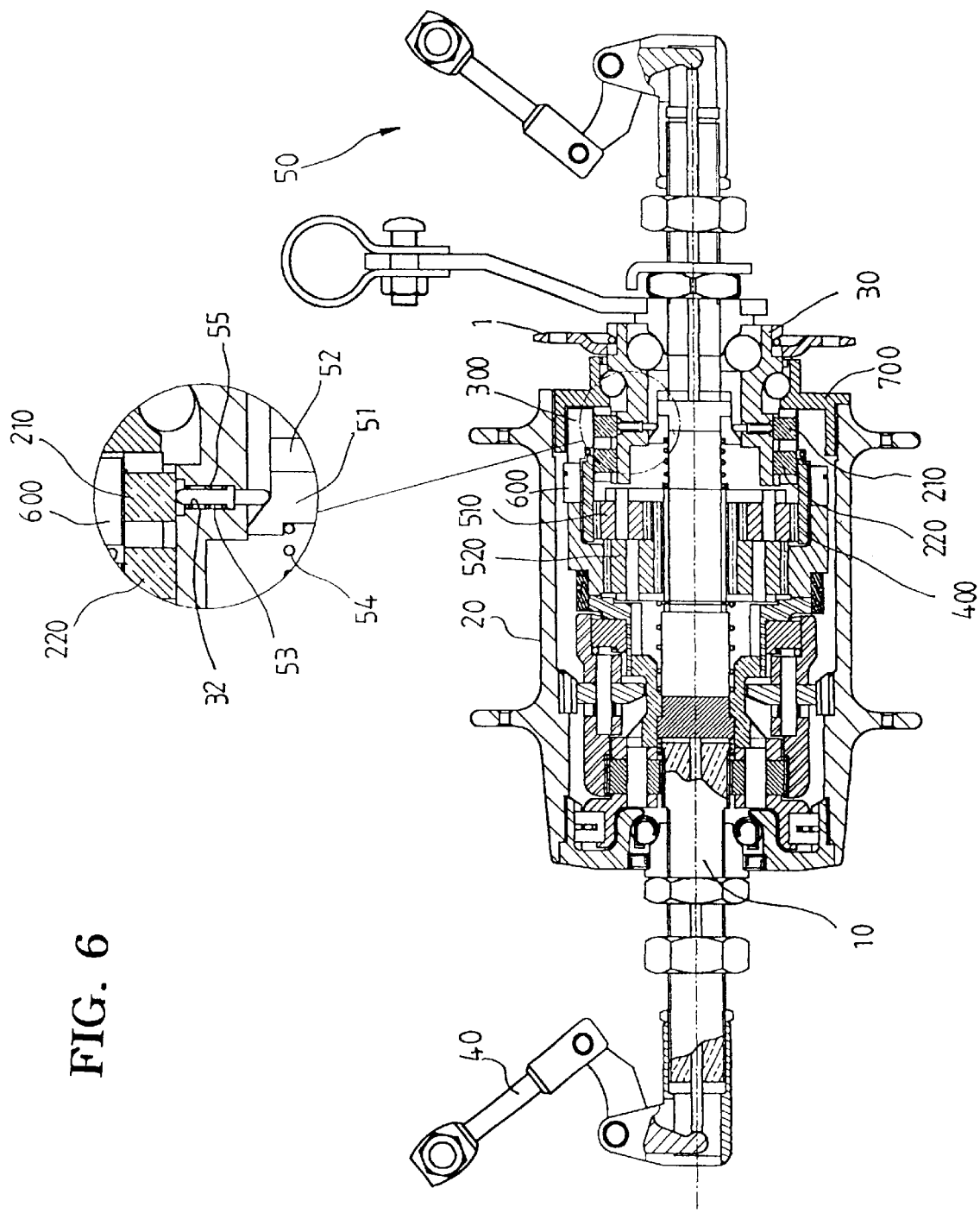
FIG. 6 is a section view of a driving direction changing apparatus of a bicycle hub according to a second embodiment of the present invention.

FIG. 6 is a section view of a driving direction changing apparatus of a bicycle hub according to a second embodiment of the present invention. Here, explanation of the same structure and the same reference numerals as those of the first embodiment, and description of the operation thereof will be omitted.

Here, as shown in FIG. 4A, at the circumference of the leading end of a driven sprocket housing 30, a polygonal curved portion 31, the side view of which is shown as a polygon, is formed, and a second control lever 50 is installed inside the driven sprocket housing 30.

The second control lever 50 includes an elastic member 54 elastically installed at one side of the second carrier 120, a slant member 51 installed to be elastically supported by the elastic force, a pushing member 52 for moving forward and rearward the slant member 51, and a pushing pin 53 ascending or descending along the slant portion of the slant member 51.

On the other hand, the pushing pin 53 ascends or descends while being elastically supported by the elastic member 55 inserted to a hole 32 formed at the driven sprocket housing 30, and the hole 32 is positioned at the same line as that of the curved portion 31.

Thus, when the second control lever 50 is operated, the pushing member 52 moves the pushing pin 53 upwards and downwards, thereby controlling moving of the first clutch pin group 210. As a result, the driving of the pedal in the forward and rearward directions can be controlled.

<Embodiment 3>

Figure 7:
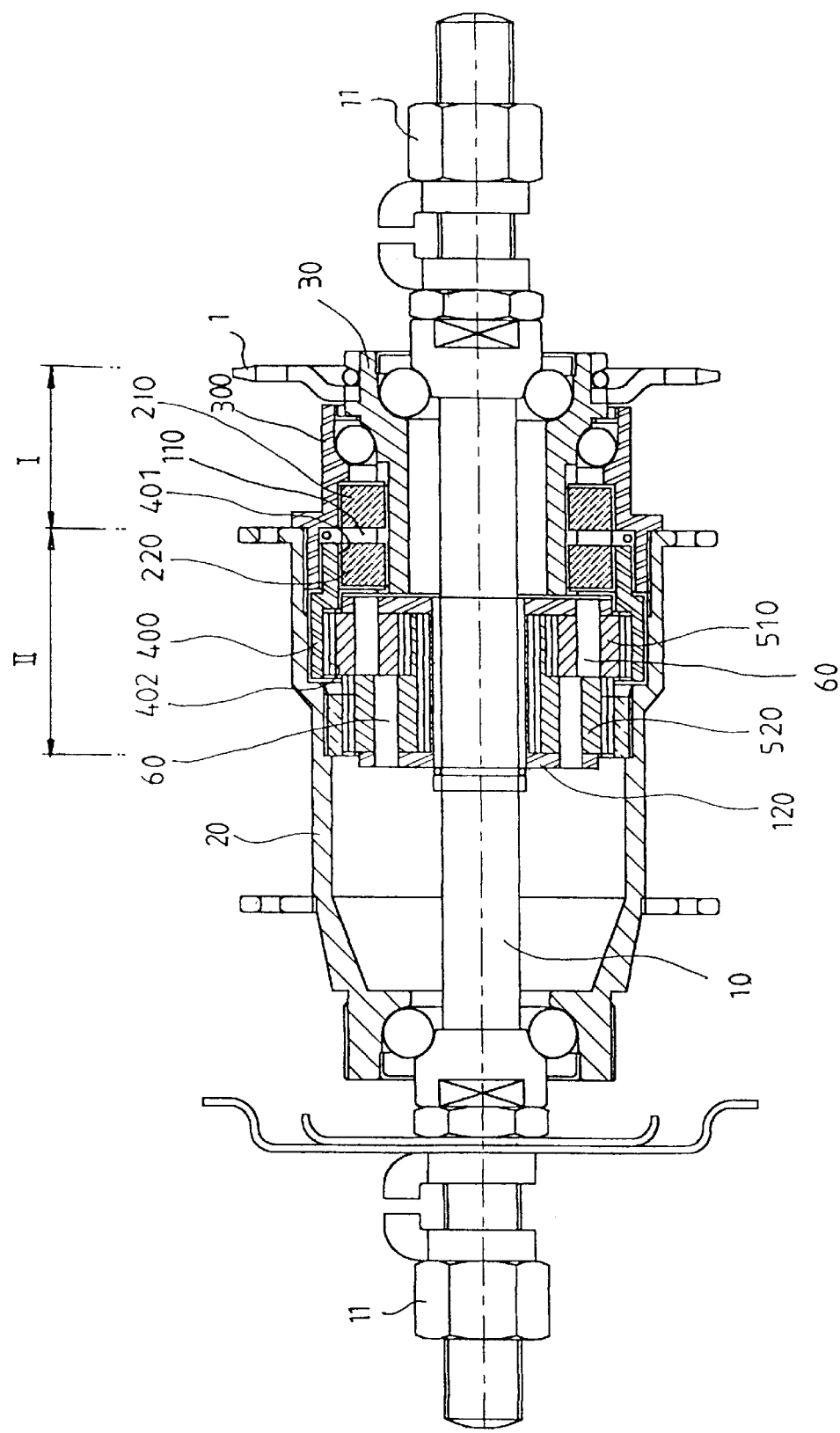
FIG. 7 is a section view of a driving direction changing apparatus of a bicycle hub according to a third embodiment of the present invention.

FIG. 7 is a section view of a driving direction changing apparatus of a bicycle hub according to a third embodiment of the present invention. Here, explanation of the same structure and the same reference numerals as those of the first embodiment, and description of the operation thereof will be omitted.

The driving direction changing apparatus of FIG. 7 is comprised of a driving portion I and a driving direction changing portion II. Here, the driving portion I includes a driven sprocket housing 30 coupled with the hub shaft 10 to be movable, first and second clutch pin groups 210 and 220 installed at the circumference of the leading end of the driven sprocket housing 30, a first carrier 110 for supporting the first and second clutch pin groups 210 and 220, and a clutch housing 300 for driving a hub shell using the expansion force caused by the frictional force of the first clutch pin group 210. The driving direction changing portion II includes a first ring gear 400 for driving the hub shell 20 by the expansion force cause by the frictional force of the second clutch pin group 220, a first idle gear 510 which rotates centering around a rotary shaft 60 as a support point while being engaged with a gear formed at the inside of the leading end of the first ring gear 400, a second idle gear 520 which rotates centering around the rotary shaft 60 as a support point while being engaged with the first idle gear 510, a second carrier 120 for supporting the second idle gear 520, and a second ring gear 410 having an inner gear 423 engaged with the second idle gear 520.

<Embodiment 4>

Figure 8:
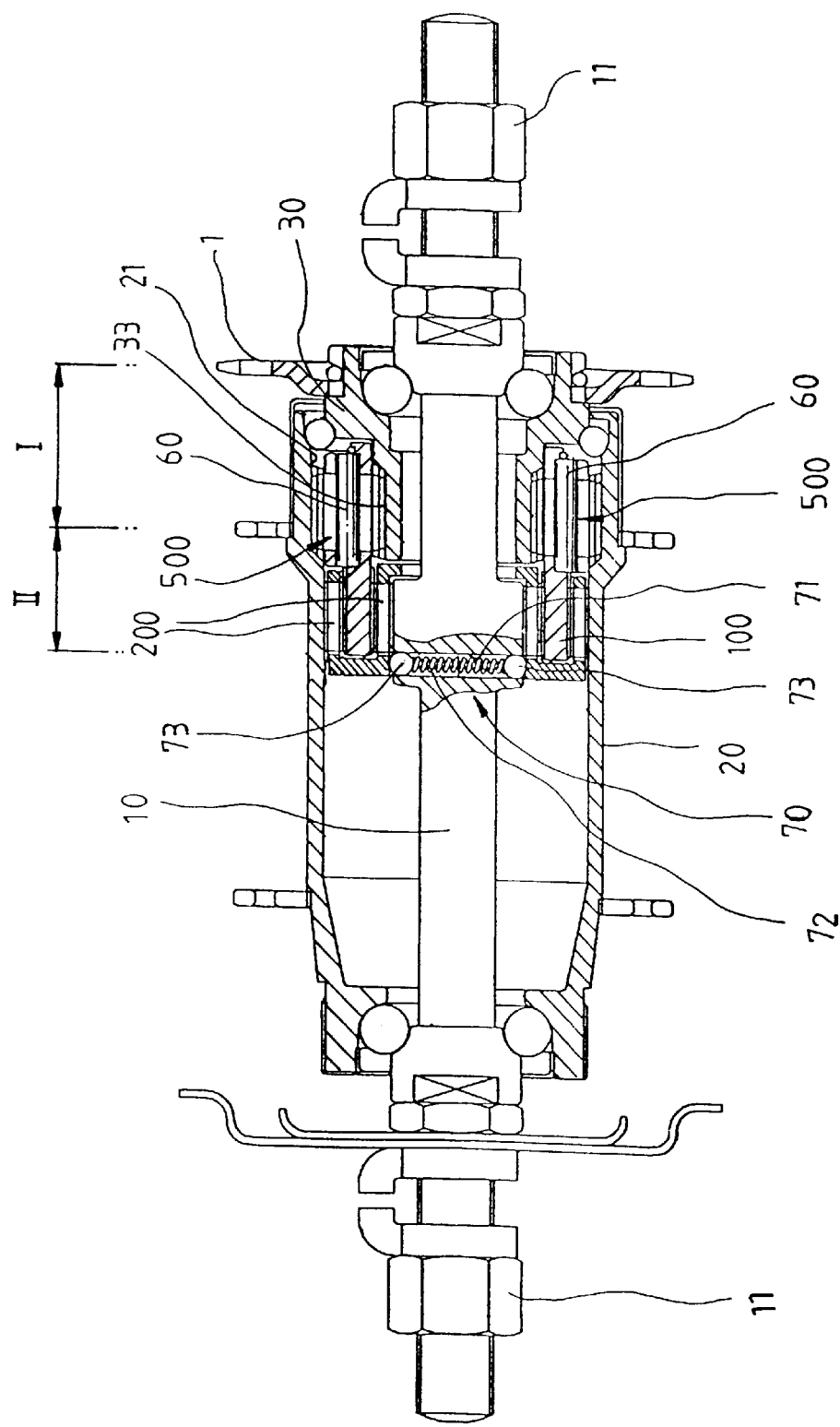
FIG. 8 is a section view of a driving direction changing apparatus of a bicycle hub according to a fourth embodiment of the present invention.

FIG. 8 is a section view of a driving direction changing apparatus of a bicycle hub according to a fourth embodiment of the present invention. Here, explanation of the same structure and the same reference numerals as those of the first through third embodiments, and description of the operation thereof will be omitted.

A balance portion 70 is installed at the center of a hub shaft 10, perpendicular to the hub shaft 10, as shown in FIG. 8. The balance portion 70 includes a spring hole 71, an elastic member 72 elastically installed within the spring hole 71 and a pair of balls 73 installed at both ends of the elastic member 72 to be elastically supported by the elastic force.

Figure 10:
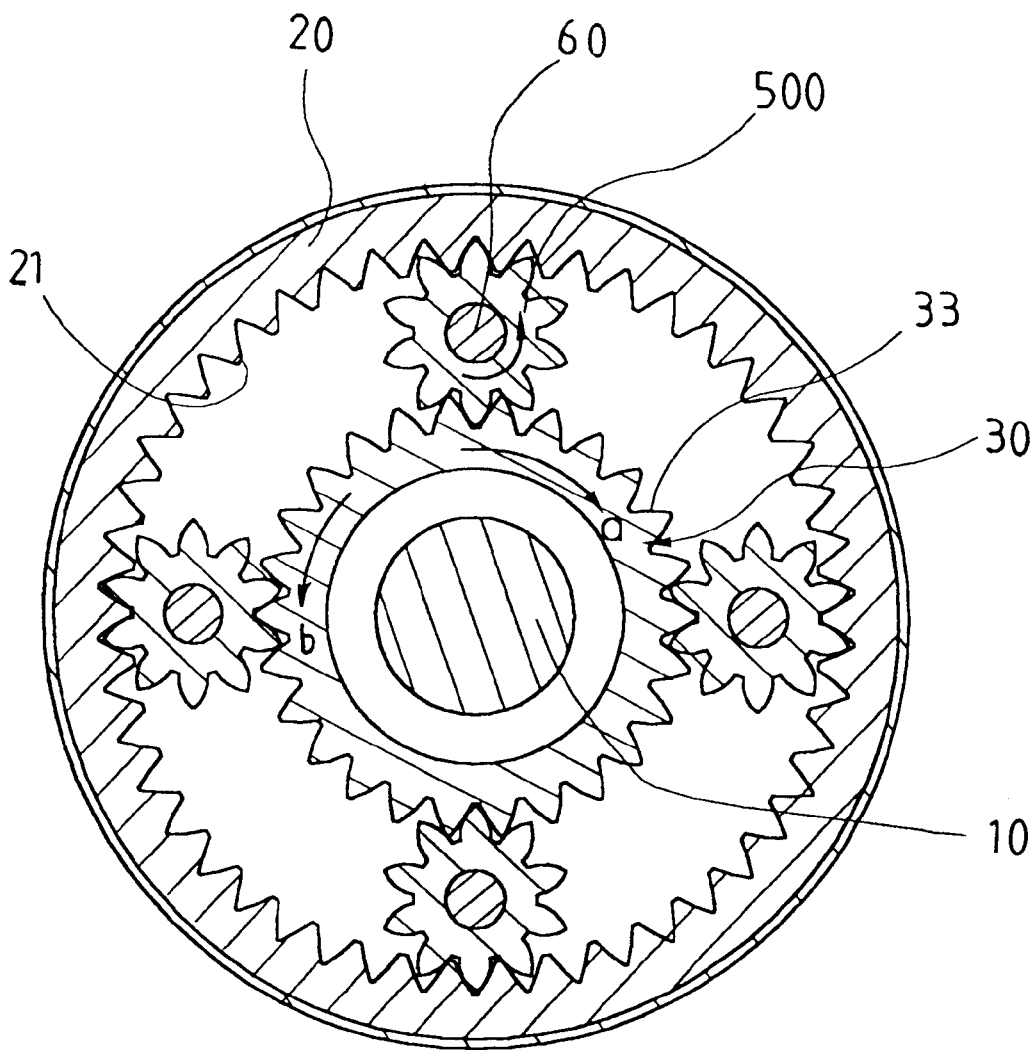
FIG. 10 is a vertical section view cut along line A—A of FIG. 8, showing the binding relationship among the hub shell, idle gears and sprocket housing.
Figure 11A:
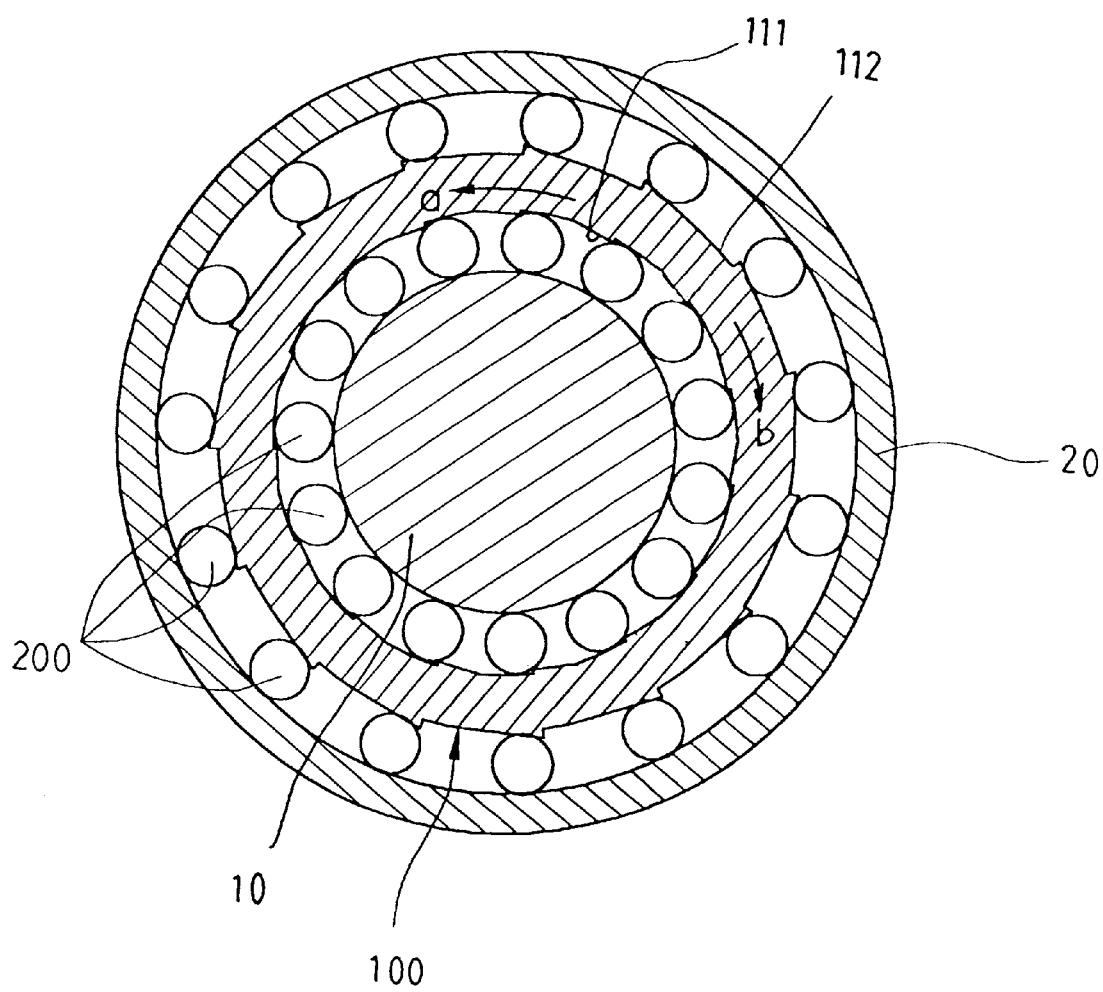
FIGS. 11A and 11B are vertical section views cut along line B—B of FIG. 8, showing the driving direction changing apparatus during forward and rearward driving, respectively.
Figure 11B:
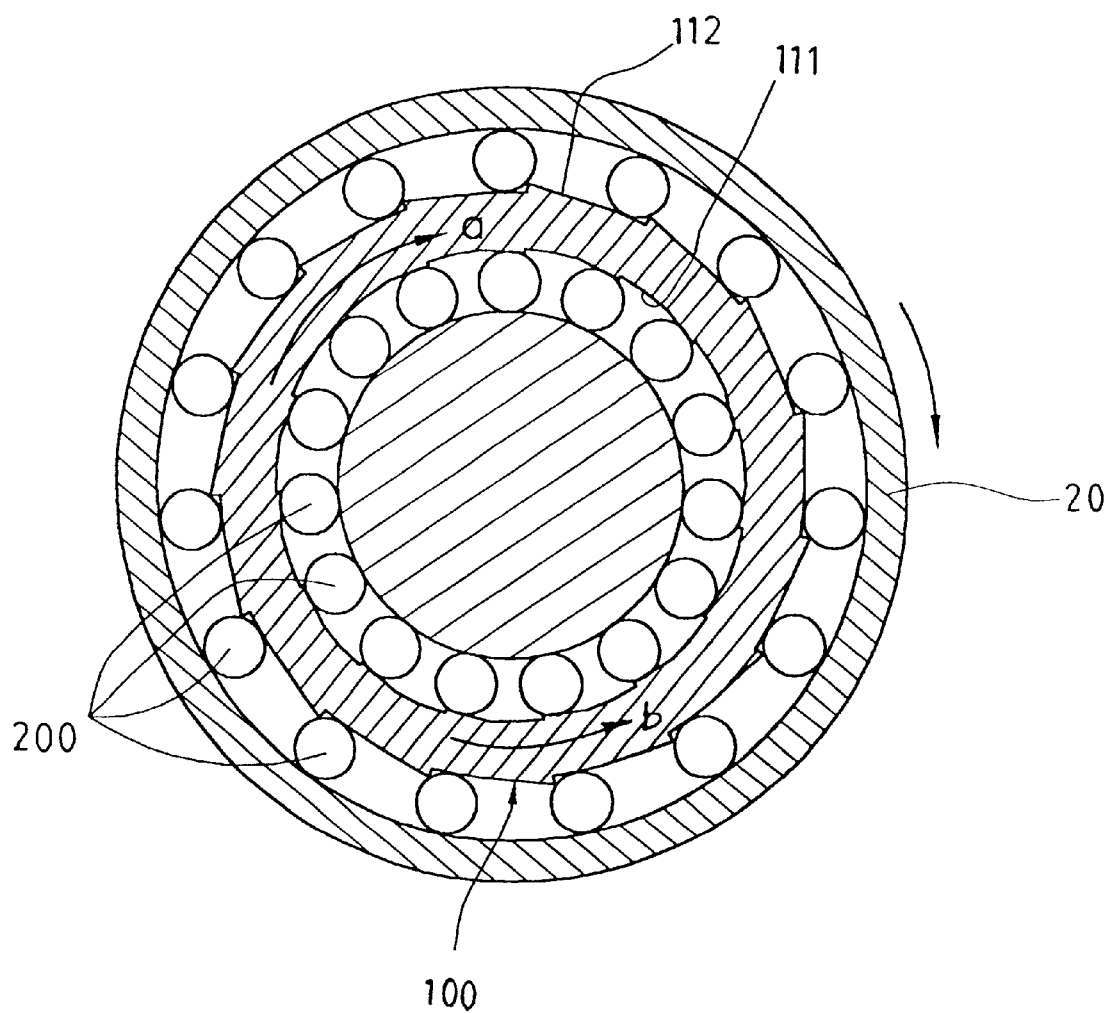

A gear 33 is formed at the circumference of the leading end of the driven sprocket housing 30, and an idle gear 500 engaged to be interlocked with the gear 33 is installed in a carrier 100 such that the idle gear 60 rotates centering around a rotary shaft 60 as a support point as shown in FIGS. 10, 11A and 11B. At the same time, the idle gear 500 is engaged with a gear 21 of a hub shell 20.

The driving direction changing portion II is installed both at the inside and the outside of the carrier 100 such that the driving direction by the driving portion I changes forward or rearward.

That is, a clutch housing 300 is installed in the hub shell 20, which drives the hub shell 20 by the frictional force of the clutch pin member 200 or stops the moving of the carrier 100, by guiding the clutch pin group 200 installed at the inner slant portion 111 and the outer slant portion 112.

Figure 9:
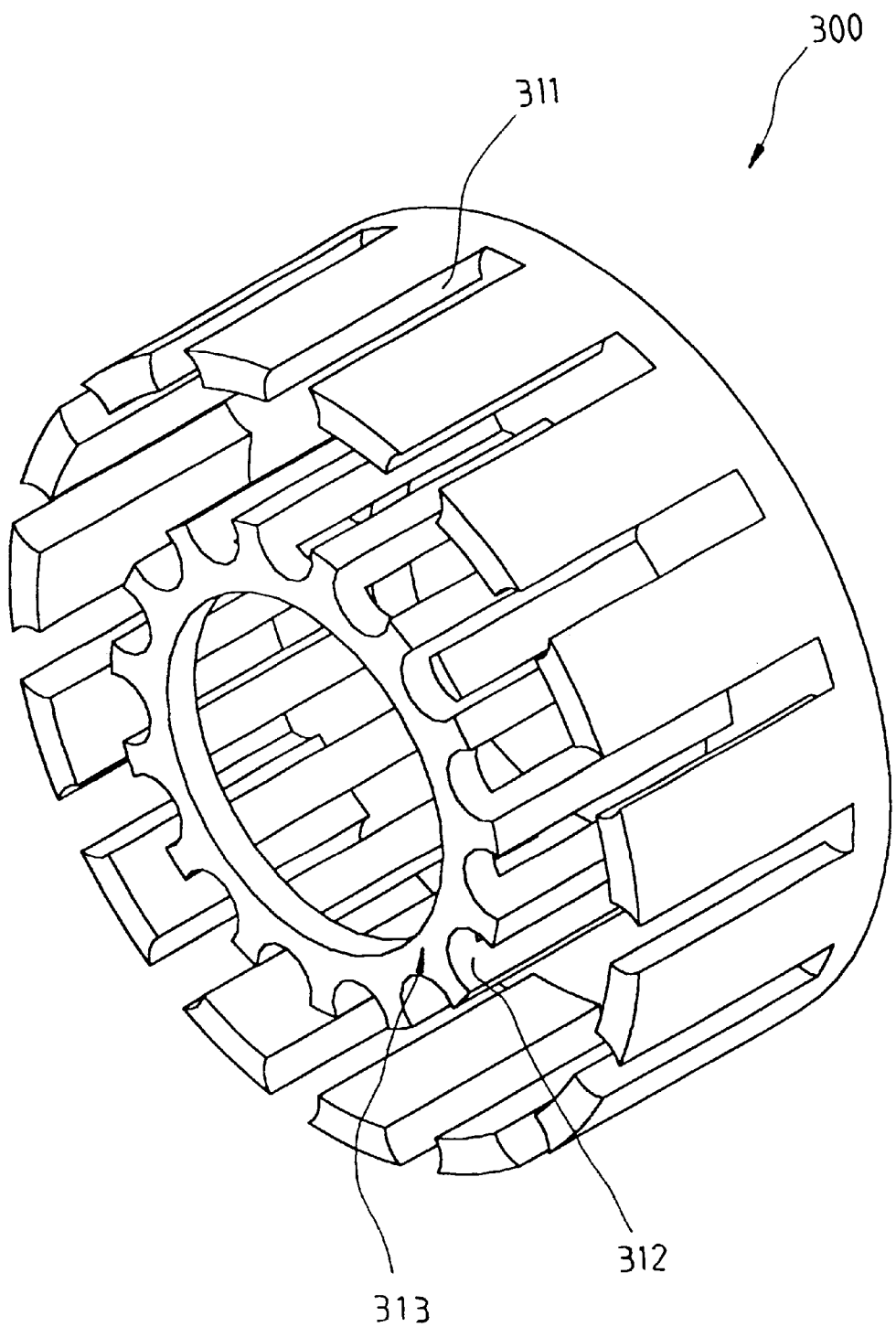
FIG. 9 is a partial perspective view of the clutch housing of FIG. 8.

As shown in FIG. 9, the clutch housing 300 has a cylindrical shape as shown in FIG. 9 and its one end is opened. Also, guide holes 311 with an open end, for guiding the clutch pin group 200, and, and guide slots 312 are formed along the whole circumference with a constant interval.

Here, the guide holes 311 and the guide slots 312 are positioned facing each other, and the guide slots 312 are formed along the circumference of a fixing portion 313 to which the hub shaft 10 is inserted in order to prevent the clutch housing 300 being separated.

The operation of the driving direction changing apparatus of a bicycle hub according to the embodiment will be described.

When a driven sprocket 1 of the driven sprocket housing 30 rotates forward by a pedal shaft and a driving sprocket in the state of FIG. 8, the driven sprocket housing 30 rotates forward, that is, the arrow direction "a", as shown in FIG. 10, and the idle gear 500 engaged with the gear 33 formed at the circumference of the driven sprocket housing 30 is likely to be driven in the opposite direction to the driven sprocket housing 30, and the carrier 100 is likely to be rotated forward. As a result, the driven sprocket housing 30, the idle gear 500 and the carrier 100 rotate integrally forward, and such driving force rotates the hub shell 20 forward. That is, the carrier 100 rotates the arrow direction "b" of FIG. 11A.

Here, the clutch pin group 200 is placed at the uppermost portion of the outer slant portion 112 of the carrier 100 to contact the inside of the hub shell 20, and simultaneously at the upper most portion of the inner slant portion 111 of the carrier 100 to be separated from the hub shaft 10, thereby rotating the hub shell 20 forward to travel the rear wheel of the bicycle forward.

That is, the clutch pin group 200 installed at the outer slant portion 112 is closely pushed against the inner wall of the hub shell 20, and the clutch pin group 200 installed at the inner slant portion 111 is separated from the hub shaft 10. Here, if the driving continues, the hub shell 20 rotates in the same direction as the idle gear 500 by the frictional force of the clutch pin group 200. In other words, the hub shell 20 rotates forward and thus the bicycle travels forward by the forward driving.

Also, during the rearward driving, that is, when pedaling pedals (not shown) rearward, the pedaling force is transferred to the driven sprocket via a chain, and the rotating force of the driven sprocket 1 is transferred to the driven sprocket housing 310 integrally formed with the driven sprocket 1.

As a result, while the driven sprocket housing 30 rotates rearward (opposite to the rotating direction of FIG. 11A) as shown in FIG. 11B, the driven sprocket housing 30 rotates in the arrow direction "b".

The idle gear 500 engaged with the gear 33 formed at the inner circumference of the driven sprocket housing 30 is driven in the opposite direction to the driven sprocket housing 30, the hub shell 20 engaged with the idle gear 500 rotates in the same direction as the rotating force of the idle gear 500, and simultaneously the carrier 100 rotates in the arrow direction "b".

Here, the clutch pin group 200 installed at the outer circumference of the carrier 100 is positioned at the lowermost end of the outer slant portion 112 to be separated from the hub shell 20, and simultaneously the clutch pin group 200 formed at the inner circumference is positioned at the lowermost end of the inner slant portion 111 of the carrier 100 to be closely pushed toward the hub shaft 10. As a result, the carrier 100 stops rotating by the frictional force of the clutch pin group 200 and the hub shell 20 rotates in the same direction as the idle gear 500 while being separated from the clutch pin group 200, thereby rotating the hub shell 20 forward. Accordingly, the rear wheel of the bicycle can travel forward by the forward and rearward driving, by installing the driving direction changing portion II.

Here, the clutch pin group 200 is placed at the inner and outer slant portions of the carrier 100 with a predetermined angle such that the clutch pin group 200 is engaged only at one slant portion, so that the rearward rotation of the hub shell 20 may be allowed.

INDUSTRIAL APPLICABILITY

As described above, in order to change the driving direction of the driven sprocket, the driving direction changing portion capable of changing the driving direction of the driving portion forward and rearward, is installed inside and outside the carrier, such that the driving direction of the hub shell is changed. Thus, the bicycle travels forward by pedaling counterclockwise, and the traveling rate can be controlled by a rider by using the first and second operating levers, and simultaneously, the bicycle can travel forward and rearward according to the intention of the rider.

Also, damage of the gears, caused by the conventional apparatus which has achieved the bi-directional driving through the engagement between gears, can be prevented, and quality of the bicycle is also improved due to its less noise and less gap.

What is claimed is:

1. A driving direction changing apparatus for a bicycle, the apparatus comprising:

a hub shaft;

a hub shell rotatably mounted on said hub shaft;

a driving portion including
 a driven sprocket housing rotatably mounted on said hub shaft,
 first and second clutch pin groups installed at an outer circumference of one end of the driven sprocket housing,
 a first carrier for supporting the first and second clutch pin groups,
 a clutch housing for driving said hub shell under an expansion force caused by frictional force of the first clutch pin group;

a driving direction changing portion including
 a first ring gear for driving the hub shell under an expansion force caused by frictional force of the second clutch pin group,
 a first idle gear engaged with a gear formed inside of one end of the first ring gear,
 a second idle gear engaged with the first idle gear,
 a second carrier for supporting the first and second idle gears,
 a second ring gear having an inner gear engaged with the second idle gear, and
 a first connecting member for interconnecting said clutch housing and said second ring gear; and a multi-stage transmission portion connected to one end of the driving direction changing portion,
 said transmission portion including a second connecting member at an outer circumference of said transmission portion, said second connecting member connecting the transmission portion to the driving direction changing portion at said one end.

2. The driving direction changing apparatus of claim 1, wherein the outer circumference of the driven sprocket housing has a polygonal cross-section as viewed from the side.

3. The driving direction changing apparatus of claim 1, wherein the first and second clutch pin groups are installed in the first carrier, diagonally facing each other.

4. The driving direction changing apparatus of claim 1, wherein the length of the first idle gear is shorter than that of the second idle gear.

5. The driving direction changing apparatus of claim 1, wherein an operating lever is installed at the multi-stage transmission portion and the driving direction changing portion, respectively.

6. A driving direction changing apparatus for a bicycle, the apparatus comprising a hub shaft;

a hub shell rotatably mounted on said hub shaft;

a driving portion including a driven sprocket housing rotatably mounted on said hub shaft, first and second clutch pin groups installed at an outer circumference of one end of the driven sprocket housing, a first carrier for supporting the first and second clutch pin groups and a clutch housing for driving said hub shell under an expansion force caused by frictional force of the first clutch pin group; and a driving direction changing portion including a first ring gear for driving the hub shell under an expansion force caused by frictional force of the second clutch pin group, a first idle gear engaged with a gear formed inside of one end of the first ring gear, a second idle gear engaged with the first idle gear, a second carrier for supporting the first and second idle gears, and a second ring gear having an inner gear engaged with the second idle gear.

* * * * *